US012145240B2

(12) United States Patent
Sawakoshi et al.

(10) Patent No.: US 12,145,240 B2
(45) Date of Patent: Nov. 19, 2024

(54) CAVITATION PROCESSING APPARATUS AND CAVITATION PROCESSING METHOD

(71) Applicant: SUGINO MACHINE LIMITED, Uozu (JP)

(72) Inventors: Jun Sawakoshi, Uozu (JP); Sho Sato, Uozu (JP); Yoichi Tokumichi, Uozu (JP); Hirokazu Kamisaka, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 400 days.

(21) Appl. No.: 17/554,292

(22) Filed: Dec. 17, 2021

(65) Prior Publication Data

US 2022/0203500 A1 Jun. 30, 2022

(30) Foreign Application Priority Data

Dec. 28, 2020 (JP) ................................ 2020-219154

(51) Int. Cl.

| | |
|---|---|
| ***B08B 3/12*** | (2006.01) |
| ***B24C 1/10*** | (2006.01) |
| ***B24C 3/12*** | (2006.01) |
| ***B24C 5/04*** | (2006.01) |

(52) U.S. Cl.

CPC ................. *B24C 3/12* (2013.01); *B08B 3/12* (2013.01); *B24C 1/10* (2013.01); *B24C 5/04* (2013.01)

(58) Field of Classification Search

CPC .. B08B 3/02; B08B 3/102; B08B 3/12; B08B 7/00; B08B 7/026; B08B 7/028; B08B 2203/0288; B08B 2209/005; B24C 3/12; B24C 7/0076; B24C 7/0084; B24C 1/10; B24C 5/04; C21D 7/07; C21D 7/06

See application file for complete search history.

(56) References Cited

U.S. PATENT DOCUMENTS

| | | | | |
|---|---|---|---|---|
| 2010/0024218 A1 | 2/2010 | Pyun et al. | | |
| 2020/0189068 A1* | 6/2020 | Sanders | .................. | B01F 25/30 |

FOREIGN PATENT DOCUMENTS

| | | | |
|---|---|---|---|
| CN | 102119068 | A | 7/2011 |
| JP | 2010-214477 | A | 9/2010 |
| JP | 2011-520042 | A | 7/2011 |
| JP | 2020-157470 | A | 10/2020 |
| JP | 2022-104132 | A | 7/2022 |
| KR | 10-0894499 | B1 | 4/2009 |
| WO | 2009/139516 | A1 | 11/2009 |

OTHER PUBLICATIONS

International Search Report (English) mailed on Aug. 30, 2022 in corresponding PCT/JP2022/025767 (2 pages).

* cited by examiner

*Primary Examiner* — David G Cormier

(74) *Attorney, Agent, or Firm* — United IP Counselors, LLC

(57) ABSTRACT

Provided is a cavitation processing apparatus for providing cavitation effects such as residual stress evenly on the surface and inner part of the component. The cavitation processing apparatus includes: a nozzle that ejects cavitation fluid to a workpiece; a direction changing member that changes a flow direction of the cavitation fluid that collided with the workpiece to be branched toward inside; a driving apparatus including a rotary shaft, the driving apparatus that rotates the workpiece together with the rotary shaft; and a support member supporting one end of the rotary shaft.

7 Claims, 6 Drawing Sheets

CAVITATION PROCESSING APPARATUS AND CAVITATION PROCESSING METHOD

CROSS-REFERENCE TO RELATED APPLICATIONS

This application claims the benefit of priority to Japanese Patent Application No. 2020-219154, filed on Dec. 28, 2020, the entire contents of which are hereby incorporated by reference.

BACKGROUND

1. Technical Field

The present invention relates to a cavitation processing apparatus and a cavitation processing method of a component surface.

2. Description of the Background

Conventionally, a cavitation processing is performed to a high performance parts such as aircraft parts to add compressive residual stress on the surface of the various parts, or to form a dimple shape for retention lubricating oil while alleviating friction. The cavitation processing is a generic term for surface treatment, peening, cleaning, peeling, cutting, deburring, etc.

The cavitation processing utilizing liquid (e.g., water) has often not been elucidated in principle. Thus, establishing a method or equipment for stably controlling cavitation is not easy.

For example, a system for processing an inner surface of a component is disclosed. The system includes a tank, fluid, a nozzle, and a deflection tool. The tank positions a component inside. The fluid in the tank submerges the component when the component is positioned in the tank. The nozzle is submerged in the fluid to generate a flow of cavitation fluid directed in a first direction. The deflection tool submerged in the fluid having a deflection surface that redirects the flow of cavitation fluid from the first direction to a second direction. The first direction is away from the inner surface of the component, and the second direction is directed to the inner surface of the component. (See, for example, Japanese Patent Application Laid-Open No. 2020-157470, hereinafter referred to as "Patent Literature 1").

BRIEF SUMMARY

As disclosed in Patent Literature 1, changing the flow direction of the cavitation fluid by using the deflection tool enables cavitation process inside the workpiece having a complex shape. However, there is room for improvement in order to certainly give cavitation to the target position of the workpiece to be cavitated.

For example, when the cavitation fluid is directly collided with the workpiece, or merely collided with the workpiece by changing the flow direction of the cavitation fluid, the cavitation processing around the target position of the workpiece, rather than the exact target position, may be caused.

The cavitation fluid ejected from the nozzle in the liquid contains cavitation bubbles. It is known that the cavitation bubbles temporarily stay in the liquid. Even if the cavitation fluid collides with the workpiece in a state where cavitation bubbles are dispersed, the cavitation effect (residual stress, etc.) is not properly given to the target position of the workpiece. That is, even if the cavitation fluid collides with the workpiece in a state where cavitation bubbles are dispersed, giving cavitation effect properly to the target position of the workpiece requires increased number of processing, and thus takes a long time.

Further, giving the cavitation effect evenly on a component having a cylindrical shape (cylindrical surface) requires checking a position adjustment of the workpiece or depth of cavitation effect (residual stress), and thus takes a number of processing and time.

The present invention is directed to provide a cavitation processing apparatus and a cavitation processing method for providing cavitation effects such as residual stress evenly on the surface and inner part of the component.

A first aspect of the present invention provides a cavitation processing apparatus, including:

- a nozzle configured to eject cavitation fluid to a workpiece;
- a direction changing member configured to change a flow direction of the cavitation fluid that collided with the workpiece to be branched toward inside;
- a driving apparatus including a rotary shaft, the driving apparatus configured to rotate the workpiece together with the rotary shaft; and
- a support member supporting one end of the rotary shaft.

A second aspect of the present invention provides a cavitation processing method, including:

- ejecting cavitation fluid from a nozzle to collide with an upper surface of a workpiece to branch a flow direction of the cavitation fluid;
- colliding the branched cavitation fluid to a side wall of a direction changing member to change the flow direction of the cavitation fluid;
- colliding the cavitation fluid that has changed the flow direction by the side wall with a bottom portion of the direction changing member to change the flow direction of the cavitation fluid; and
- colliding the cavitation fluid that has changed the flow direction by the bottom portion with a lower surface of the workpiece.

According to the cavitation processing apparatus and the cavitation processing method of the present invention, the cavitation effects such as residual stress are evenly given on the surface and inner part of the component.

DETAILED DESCRIPTION

Embodiments of the present invention will be described in detail with reference to the drawings as appropriate.

Figure 1:
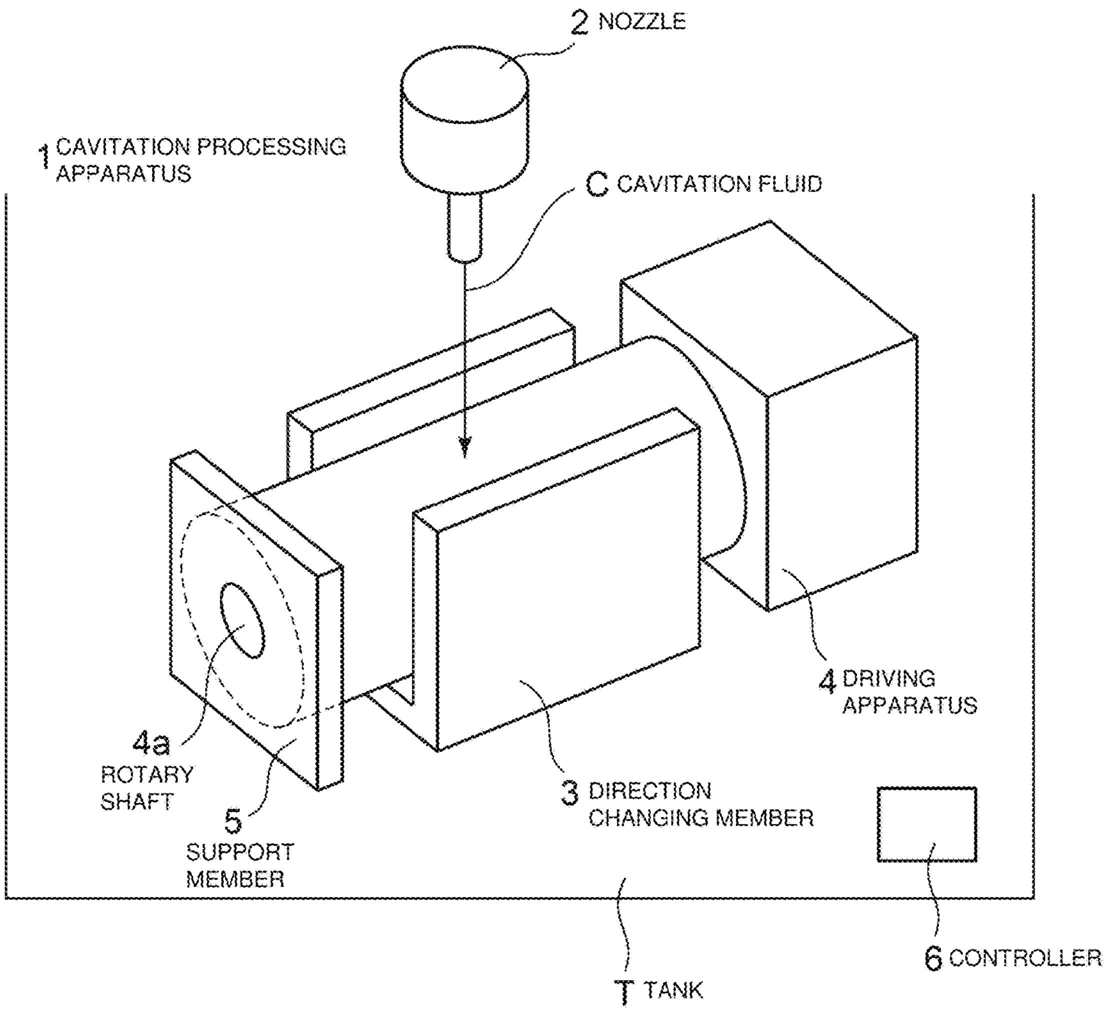
FIG. 1 is a perspective view showing a cavitation processing apparatus of a first embodiment.

A cavitation processing apparatus 1 of the present embodiment performs a cavitation process for the high performance parts used in the nuclear power field or the like, or to the surface of the general metal member or the like. As shown in FIG. 1, the cavitation processing apparatus 1 includes a nozzle 2, a direction changing member 3, a driving apparatus 4, and a support member 5. The nozzle 2 ejects cavitation fluid C1 to a workpiece W. The direction changing member 3 changes the flow direction of cavitation fluid C2 collided with the workpiece W to be branched. The driving apparatus 4 has a rotary shaft 4*a*. For example, the rotary shaft 4*a*, which has an axisymmetric shape (cylinder, round bar, etc.), is inserted and fixed to the center of the workpiece W. The rotary shaft 4*a* is rotated in response to the driving of the driving apparatus 4. The support member 5 is disposed at the distal end of the rotary shaft 4*a* to support the rotary shaft 4*a*.

The nozzle 2 ejects the cavitation fluid C1 supplied from the high-pressure fluid supply source (not shown). The cavitation fluid C1 collides with an upper surface of the workpiece W. Then, the cavitation fluid C1 is branched to change the flow direction. This provides the primary cavitation effect on the upper surface of the workpiece W.

The cavitation fluid C1 colliding with a position eccentric than the center of the workpiece W stabilizes a speed of the cavitation fluid C or the flow direction of the branched cavitation fluid C. For example, positioning the nozzle 2 such that an extension line of the nozzle 2 passes through a position deviated from the rotation center of the workpiece W, or inclining an ejection angle of the cavitation fluid C1 ejected from the nozzle 2 causes the cavitation fluid C1 to be eccentric than the center of the workpiece W.

For example, when the cavitation fluid C1 is eccentric to either left or right than the center of the workpiece W, the amount of the cavitation fluid C2 branching to the eccentric side is increased, while the amount of the cavitation fluid C2 branching to the opposite side is reduced. The larger amount of cavitation fluid C2 provides the larger effect on the flow direction. Further, it is possible to suppress the cavitation bubble CA contained in the cavitation fluid C2 from diffusing. This maintains the impact force of the cavitation fluid C2.

Further, by adjusting the distance S (standoff distance) from the nozzle 2 to the upper surface of the workpiece W, the impact force applied on the surface of the workpiece W is changed.

The direction changing member 3 changes the flow direction of the cavitation fluid C2 branched by colliding with the workpiece W to surround the inside of the direction changing member 3. The direction changing member 3 includes a side wall 3*a*, and a bottom portion 3*b*. The side wall 3*a* secondary changes the flow direction of the cavitation fluid C2 branched by colliding with the workpiece W. The bottom portion 3*b* tertiary changes the flow direction of the cavitation fluid C3 the flow direction of which is changed by colliding with the side wall 3*a*. The side wall 3*a* and the bottom portion 3*b* form a concave shape of the direction changing member 3. The direction changing member 3 may have any shape rather than the concave shape as long as the flow direction of the cavitation bubbles CA surrounding the cavitation fluid C generated when the cavitation fluid C1 collides with the upper surface of the workpiece W or the flow direction of the cavitation fluid C2 surround the inside of the direction changing member 3.

Figure 2:
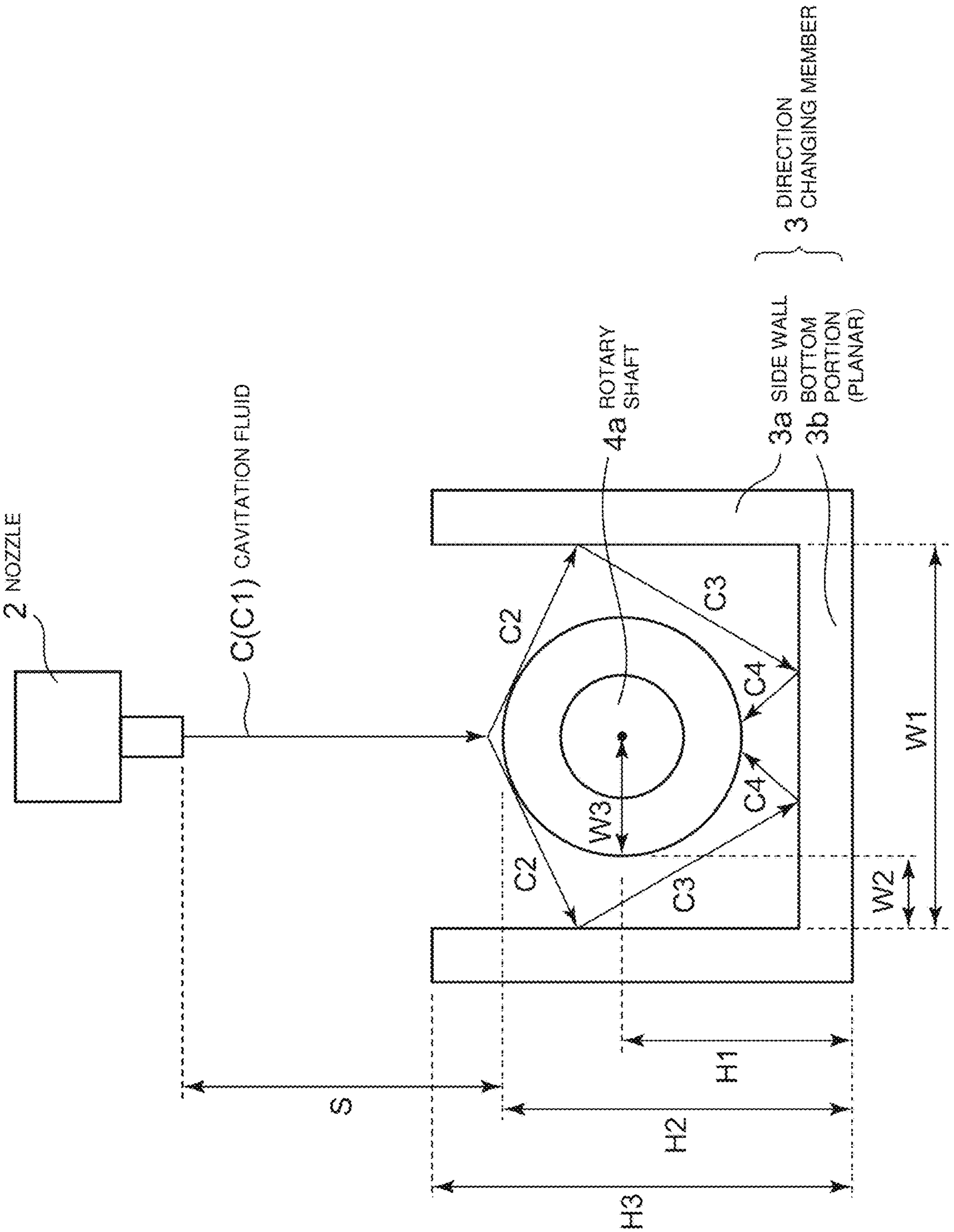
FIG. 2 is a front view showing the cavitation processing apparatus of the first embodiment.
Figure 3:
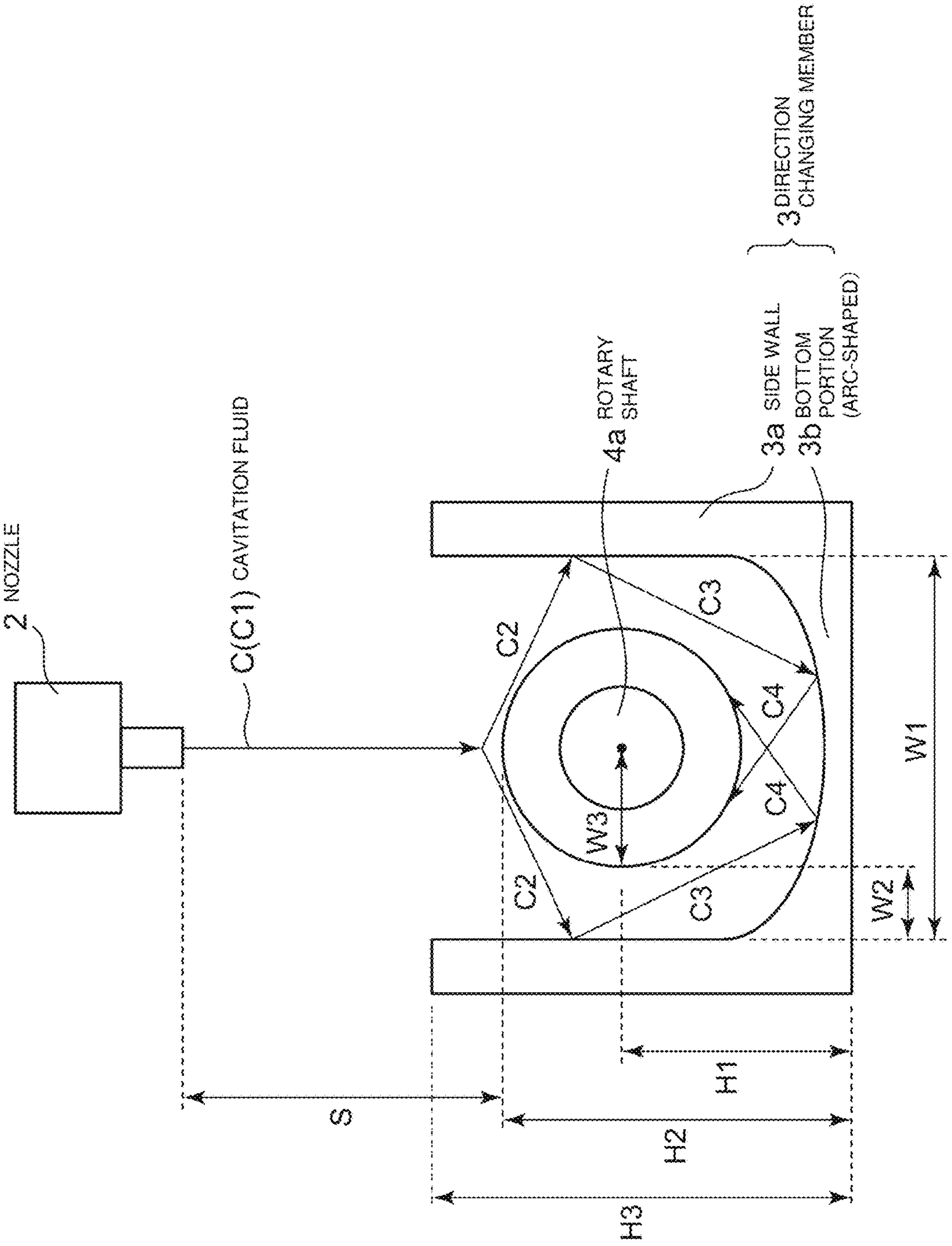
FIG. 3 is a front view showing the cavitation processing apparatus of a second embodiment.

As shown in FIGS. 2 and 3, what is important is the cavitation bubbles CA surrounding the cavitation fluid C generated when the cavitation fluid C1 collides with the upper surface of the workpiece W, or the shape of the direction changing member 3 to change the flow direction of the cavitation fluid C2 to surround the inside of the direction changing member 3. The side wall 3*a* and the bottom portion 3*b* are, for example, a planar or arc-shaped. FIG. 2 shows an example in which the side wall 3*a* and the bottom portion 3*b* are planar shape. FIG. 3 shows an example in which the side wall 3*a* is planar shape, while the bottom portion 3*b* is arc-shaped. In FIGS. 2 and 3, the flow direction of the cavitation fluid C or the collision position on the workpiece W on the inside of the direction changing member 3 is different.

The direction changing member 3 having a concave shape has important factors of the height H1 to H3 and the width W1, W2 described below.

The side wall 3*a* has the height H3. The cavitation fluid C collides with the workpiece W at the height H2. Setting the height H3 higher than the height H2 prevents the cavitation fluid C2 that is branched by colliding the cavitation fluid C1 to the workpiece W from splashing out of the direction changing member 3.

The bottom portion 3*b* has an inner width W1. The workpiece W and the side wall 3*a* has a horizontal distance W2. Preferably, the cavitation bubbles CA surrounding the cavitation fluid C or the cavitation fluid C2 collide with the lower surface of the workpiece W by changing the flow direction multiple times. Thus, the width W2 where the cavitation bubbles CA surrounding the cavitation fluid C or the cavitation fluid C2 branched by colliding with the workpiece W passes is preferably equal to or less than the radius of the workpiece W. This causes the cavitation bubbles CA effectively surround the cavitation fluid C.

For example, when the workpiece W is cylindrical, rotating the rotary shaft 4*a* sequentially changes the cavitation processing position. The cavitation fluid C, ejected from the nozzle 2 and colliding on the surface of the workpiece W, gives the primary cavitation effect on the surface of the workpiece W. Further, by rotating the workpiece W, the surface to which the cavitation effect has been primarily given rotates downward. The cavitation bubbles CA surrounding the cavitation fluid C inside the direction changing member 3 or the cavitation fluid C4 collides again with the surface of the workpiece W, whereby to give the secondary cavitation effect on the surface of the workpiece W. That is, in addition to the primary cavitation effect, a cavitation effect is given to a deeper position of the workpiece W.

The support member 5 supports the rotary shaft 4*a*. The support member 5 includes a rotation support mechanism so as not to stop the rotation of the rotary shaft 4*a*.

The cavitation processing apparatus 1 may include a controller 6 that regulates the amount of cavitation bubbles CA. For example, the cavitation bubbles CA are affected by a temperature change in the liquid. The controller 6 is, for example, a commercially available temperature regulating device. The optimum temperature is, for example, 40 to 50° C. The controller 6 adjusts the temperature in accordance with the environment in the liquid or the cavitation effect desired for the workpiece W.

Next, the cavitation processing method of the present embodiment will be described.

At first, the workpiece W is fixed to the rotary shaft 4*a* while conditioning the cavitation process such as the height of the nozzle 2. The tank T is filled with liquid (e.g., water) before or after the workpiece W is fixed. Performing the cavitation processing in liquid leads to stably surround the cavitation bubbles CA or the cavitation fluid C. Thus, the optimum amount of the cavitation bubbles CA are collided with the workpiece W to obtain the optimum cavitation effect.

Next, a high-pressure water supply source (not shown) is activated to fix the position of the nozzle 2. Then, the cavitation fluid C1 is ejected from the nozzle 2 to collide with the upper surface of the workpiece W to branch the flow direction of the cavitation fluid C1 (first direction change).

The cavitation fluid C1 colliding with a position eccentric than the center of the workpiece W gives a greater cavitation effect.

Next, the branched cavitation fluid C2 collides with the side wall 3*a* of the direction changing member 3 to change the flow direction of the cavitation fluid C2 (second direction change). Then, the cavitation fluid C3 collides with the bottom portion 3*b* of the direction changing member 3 to change the flow direction of the cavitation fluid C3 (third direction change).

Finally, the cavitation fluid C4 collides with the lower surface of the workpiece W. Thus, the primary cavitation effect on the upper surface of the workpiece W (application of residual stress to the surface), and the secondary cavitation effect on the lower surface of the workpiece W (application of residual stress to the deep portion) can be applied stepwise. This allows the workpiece W to remain compressive stress in a short time than before without excessive load.

Next, a verification test of the cavitation effect according to the cavitation processing apparatus 1 of the embodiment will be described.

Verification Test 1

The position of the nozzle 2 was fixed by using the cavitation processing apparatus 1. The cavitation fluid C1 of 70 MPa supplied from the high-pressure water supply source (not shown) had collided for 5 minutes directly with the upper surface of the workpiece W (stainless steel round bar) for the verification test.

Figure 4A:
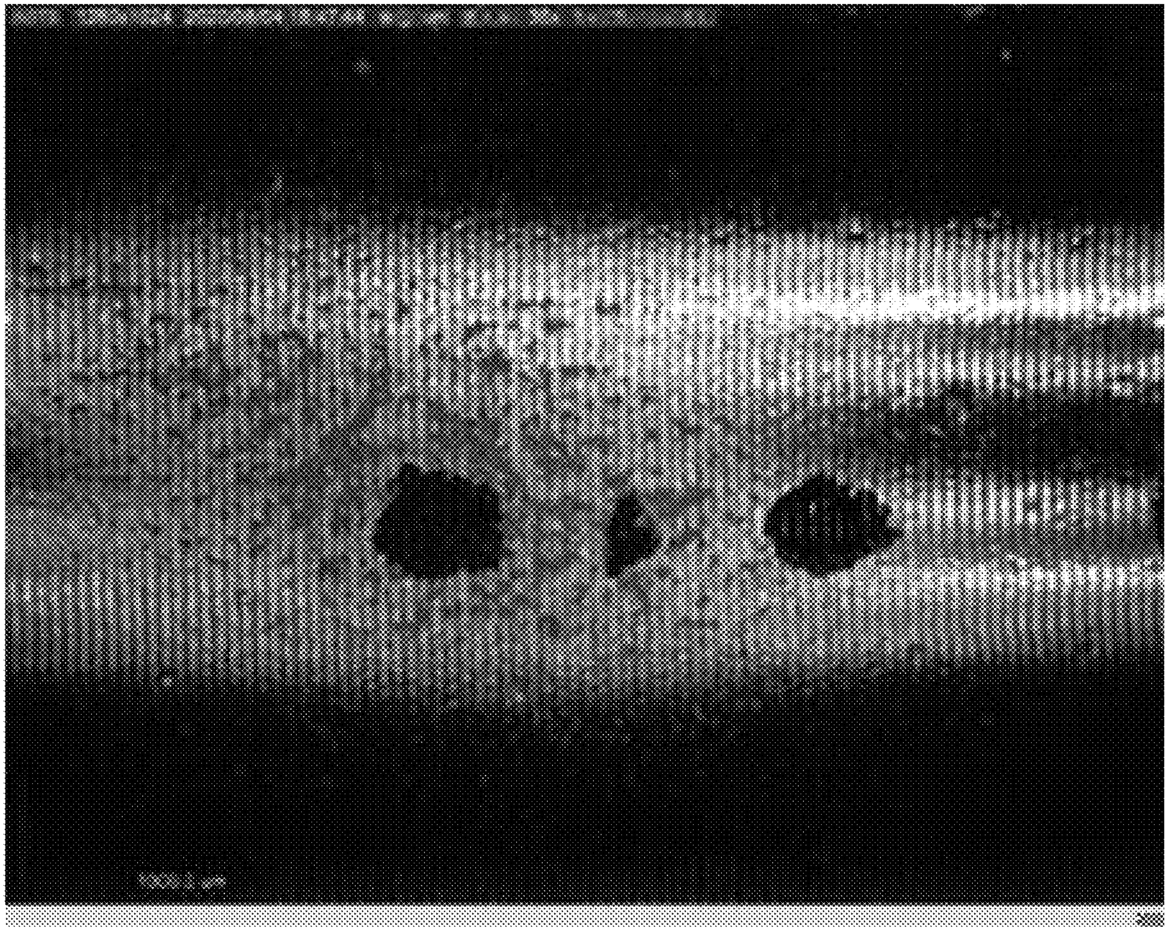
FIG. 4A shows the test results of Verification Test 1.

FIG. 4A shows the test results of the Verification Test 1. Visually, it can be seen that the left surface of the workpiece W is peeled off thinly. The residual stress was measured using a commercially available residual stress measuring device, and the compressive stress in the negative 400 MPa remained.

Verification Test 2

The position of the nozzle 2 was fixed by using the cavitation processing apparatus 1. The cavitation fluid C1 of 70 MPa supplied from the high-pressure water supply source (not shown) had collided with the upper surface of the workpiece W (stainless steel round bar) for the verification test fixed to the rotary shaft 4*a*. Then, the cavitation fluid C2 had collided for 5 minutes with the side wall 3*a* and the bottom portion 3*b* of the direction changing member 3 for the cavitation fluid C4 to collide with the lower surface of the workpiece W through the inside of the direction changing member 3.

Figure 4B:
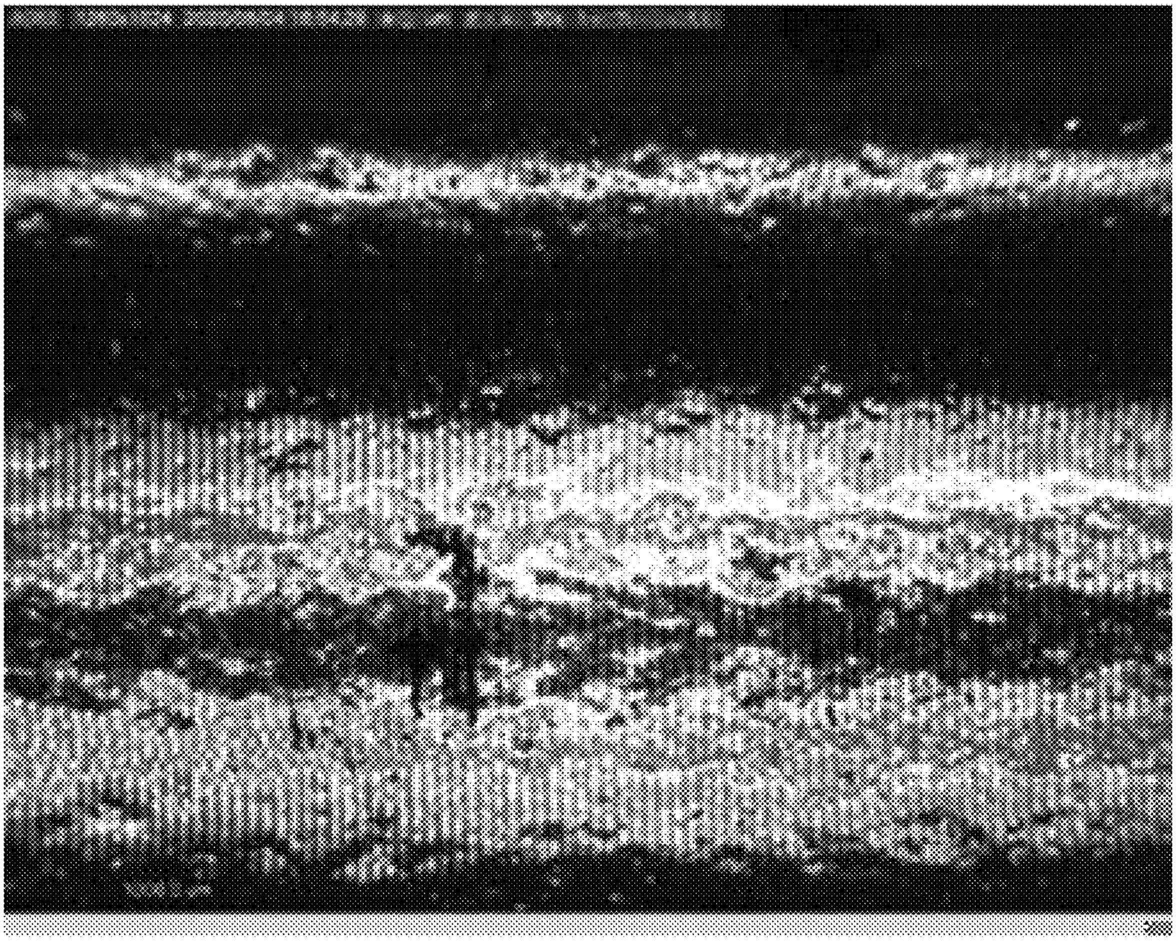
FIG. 4B shows the test results of Verification Test 2.

FIG. 4B shows the test results of the Verification Test 2. Visually, it can be seen that uneven dimples are formed on the surface of the workpiece W. The residual stress was measured using a commercially available residual stress measuring device, and the compressive stress in the negative 550 MPa remained.

Comparing the Verification Test 1 and the Verification Test 2, it was found that the Verification Test 2 had a higher value of compressive stress as well as a relatively large dimple formed on the surface. This clarified that there was a difference between the primary cavitation effect on the upper surface of the workpiece W and the secondary cavitation effect on the lower surface of the workpiece W.

It takes considerable time to reach the level of the secondary cavitation effect on the lower surface of the workpiece W performed in the Verification Test 2 by simply continuing the application of the primary cavitation effect on the upper surface of the workpiece W performed in the Verification Test 1. Further, the workpiece W itself may become brittle if the cavitation processing is performed for a long time.

Verification Test 3

Both the Verification Test 1 and the Verification Test 2 were performed. Specifically, the rotary shaft 4*a* and the workpiece W were rotated by driving the driving apparatus 4 in the cavitation processing apparatus 1. Then, the position of the nozzle 2 was fixed. The cavitation fluid C1 of 70 MPa supplied from the high-pressure water supply source (not shown) collided with the upper surface of the workpiece W (stainless steel round bar) for the verification test that was fixed to the rotary shaft 4*a*. Then, the cavitation fluid C4 had collided for 19 minutes with the side wall 3*a* and the bottom portion 3*b* of the direction changing member 3 for the cavitation fluid C4 to collide with the lower surface of the workpiece W through the inside of the direction changing member 3.

Figure 4C:
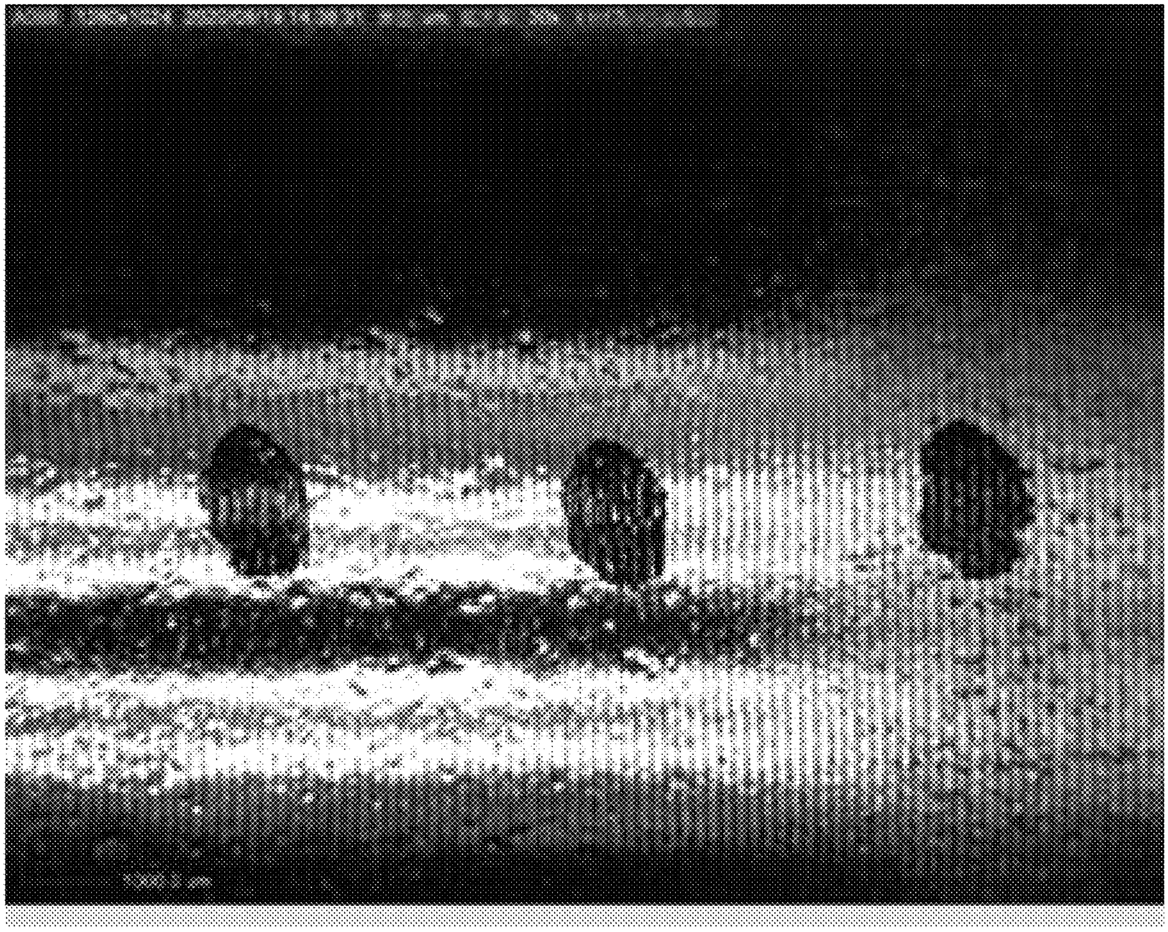
FIG. 4C shows the test results of Verification Test 3.

FIG. 4C shows the test results of the Verification Test 3. It can be seen not only that the left surface of the workpiece W is peeled off thinly as in the Verification Test 1, but also the uneven dimples on the surface of the workpiece W as in the Verification Test 2. The residual stress was measured using a commercially available residual stress measuring device, and the compressive stress in the negative 550 MPa remained.

According to the Verification Test 3, the primary cavitation effect on the upper surface of the workpiece W (application of residual stress to the surface), and the secondary cavitation effect on the lower surface of the workpiece W (application of residual stress to the deep portion) can be applied stepwise. This allows the workpiece W to remain compressive stress in a short time than before without excessive load.

As described above, the present invention is not limited to the above-described embodiment, and it is needless to say that the present invention can be appropriately modified without departing from the spirit thereof.

REFERENCE SIGNS LIST

- 1 Cavitation processing apparatus
- 2 Nozzle
- 3 Direction changing member
- 4 Driving apparatus
- 5 Support member
- 6 Controller
- C1 to C4 Cavitation fluid
- CA Cavitation bubble
- S Standoff distance
- H1 to H3 Height
- W1 to W3 Width
- W Workpiece
- T Tank

What is claimed is:

1. A cavitation processing apparatus, comprising:

a tank configured to hold cavitation fluid therein;

a direction changing member disposed inside the tank and having a recessed shape;

a driving apparatus including a rotary shaft and a support member supporting an end of the rotary shaft, the driving apparatus and the support member being configured and arranged to support and rotate a workpiece disposed within the recess of the direction changing member; and a nozzle configured and arranged to eject cavitation fluid toward the workpiece disposed within the recess of the direction changing member;

the direction changing member being configured to change a flow direction of the cavitation fluid that has collided with the workpiece disposed within the recess of the direction changing member, the direction changing member including a side wall configured to change the flow direction of the cavitation fluid that has collided with the workpiece and that has branched off therefrom, and a bottom portion configured to change the flow direction of the cavitation fluid that has collided with and been deflected by the side wall.

2. The cavitation processing apparatus according to claim 1, wherein the nozzle is arranged to eject the cavitation fluid to collide with a position eccentric to a center of the workpiece.

3. The cavitation processing apparatus according to claim 1, wherein the side wall has a height higher than a height at which the cavitation fluid collides with the workpiece.

4. The cavitation processing apparatus according to claim 1, wherein a horizontal distance between the workpiece and the side wall is equal to or less than a radius of the workpiece.

5. The cavitation processing apparatus according to claim 2, wherein the side wall has a height higher than a height at which the cavitation fluid collides with the workpiece.

6. The cavitation processing apparatus according to claim 2, wherein a horizontal distance between the workpiece and the side wall is equal to or less than a radius of the workpiece.

7. The cavitation processing apparatus according to claim 3, wherein a horizontal distance between the workpiece and the side wall is equal to or less than a radius of the workpiece.

* * * * *